United States Patent [19]
Yoshino et al.

[11] Patent Number: 5,631,100
[45] Date of Patent: May 20, 1997

[54] SECONDARY BATTERY

[75] Inventors: Akira Yoshino, Fujisawa; Yumiko Takizawa, Yokohama; Akira Koyama, Kawasaki; Katsuhiko Inoue, Yokohama; Masataka Yamashita; Yasufumi Minato, both of Kawasaki; Isao Kuribayashi, Yokosuka, all of Japan

[73] Assignee: Asahi Kasei Kogyo Kabushiki Kaisha, Osaka, Japan

[21] Appl. No.: 117,175

[22] PCT Filed: Sep. 14, 1992

[86] PCT No.: PCT/JP92/01175

§ 371 Date: Sep. 20, 1993

§ 102(e) Date: Sep. 20, 1993

[87] PCT Pub. No.: WO93/06628

PCT Pub. Date: Apr. 1, 1993

[30] Foreign Application Priority Data

Sep. 13, 1991 [JP] Japan .................. 3-261293

[51] Int. Cl.⁶ .................................... H01M 10/50
[52] U.S. Cl. ................ 429/62; 429/94; 429/197; 429/218; 429/217; 429/245
[58] Field of Search ................ 429/194, 217, 429/218, 94, 197, 7, 62, 90, 245

[56] References Cited

U.S. PATENT DOCUMENTS

| | | | |
|---|---|---|---|
| 4,357,215 | 11/1982 | Goodenough et al. | 429/194 X |
| 4,617,243 | 10/1986 | Nogami et al. | 429/194 |
| 4,668,595 | 5/1987 | Yoshino et al. | 429/218 X |
| 4,689,475 | 8/1987 | Kleiner et al. | 219/553 |
| 4,717,634 | 1/1988 | Daifuku et al. . | |
| 4,725,422 | 2/1988 | Miyabayashi et al. | 429/218 X |
| 4,814,242 | 3/1989 | Maxfield et al. | 429/217 |
| 4,943,497 | 7/1990 | Oishi et al. | 429/53 |

FOREIGN PATENT DOCUMENTS

| | | |
|---|---|---|
| 0398689 | 11/1990 | European Pat. Off. . |
| 59-3476 | 1/1984 | Japan . |
| 63-121259 | 5/1988 | Japan . |
| 63-121260 | 5/1988 | Japan . |
| 4-026071 | 1/1992 | Japan . |
| 4-082156 | 3/1992 | Japan . |

OTHER PUBLICATIONS

Partial English language translation of Japanese Application Laid-Open Specification No. 59-3476 (No date avail.).

*Primary Examiner*—Anthony Skapars
*Attorney, Agent, or Firm*—Birch, Stewart, Kolasch & Birch, LLP

[57] ABSTRACT

A secondary battery is comprising an organic electrolytic solution contained in a casing and, disposed therein, a positive electrode comprised of a lithium-containing composite metal oxide as a cathode active material and a negative electrode comprised of a carbonaceous material as an anode active material, wherein the positive and negative electrodes are separated through a separator disposed therebetween and wherein the organic electrolytic solution has a water content of from 5 ppm to 450 ppm.

17 Claims, 1 Drawing Sheet

SECONDARY BATTERY

BACKGROUND OF THE INVENTION

1. Field of the Invention

The present invention relates to a secondary battery. More particularly, the present invention is concerned with a secondary battery comprising an organic electrolytic solution having disposed therein a positive electrode comprised of a lithium-containing composite metal oxide as a cathode active material and a negative electrode comprised of a carbonaceous material as an anode active material, wherein the organic electrolytic solution has a water content of from 5 ppm to 450 ppm, so that the secondary battery has excellent current efficiency, cycle characteristics, storage characteristics and safety.

2. Discussion of Related Art

In recent years, various non-aqueous type secondary batteries have been proposed as compact, light weight batteries to be advantageously substituted for conventional acid-lead batteries and nickel-cadmium batteries. Among these proposed secondary batteries, new type secondary batteries using a composite metal oxide comprised mainly of Li and Co as a cathode active material and using a carbonaceous material as an anode active material, have been attracting attention in the art. Such new type secondary batteries are disclosed in, for example, Japanese Patent Application Laid-Open Specification Nos. 62-90,863 (corresponding to U.S. Pat. No. 4,668,595), 63-121,260, and 3-49,155 (corresponding to U.S. Pat. No. 4,943,497).

In conventional non-aqueous type secondary batteries, metallic lithium or a lithium alloy has been used as an anode active material. Such conventional secondary batteries using metallic lithium or the like as an anode active material, are satisfactory with respect to compactness in size and lightness in weight, but have various problems in practical use thereof, such as a lowering of cycle characteristics and a lowering of storage characteristics due to the deposition of dendrites, an occurrence of internal short-circuiting due to the breakage of a separator by deposited dendrites, and a safety problem ascribed to the high reactivity of metallic lithium.

In contrast, with respect to the above-mentioned new type secondary batteries using a carbonaceous material as an anode active material, no deposition of dendrites occurs, so that excellent cycle characteristics and storage characteristics can be enjoyed, and, in addition, the carbonaceous material does not have a high reactivity, unlike metallic lithium, so that extremely high safety can be achieved. Especially, it has been expected that the combined use of a carbonaceous material anode and a lithium-containing composite metal oxide cathode would provide a secondary battery exhibiting high voltage and high capacity.

However, actually, such non-aqueous type secondary batteries using a lithium-containing composite metal oxide as a cathode active material in combination with a carbonaceous material as an anode active material, frequently suffer not only from various problems in performance, such as a lowering of current efficiency and a lowering of cycle characteristics, but safety problems also develop due to the occurrence of a rise in internal pressure.

SUMMARY OF THE INVENTION

In these situations, the present inventors have made extensive and intensive studies with a view toward solving various problems accompanying the above-mentioned non-aqueous type secondary battery, namely, the problems in performance, such as the lowering of current efficiency and lowering of cycle characteristics, as well as the safety problems caused by the occurrence of a rise in internal pressure. As a result, it has unexpectedly been found that when the water content of an organic electrolytic solution is suppressed to 450 ppm or less, the above-mentioned non-aqueous type secondary battery can exhibit not only excellent performance characteristics but also high safety. The present invention has been completed, based on this novel finding.

Accordingly, it is an object of the present invention to provide a secondary battery using a lithium-containing composite metal oxide as a cathode active material and a carbonaceous material as an anode active material, which is excellent in not only current efficiency and cycle characteristics, but also storage characteristics and safety.

DETAILED DISCUSSION

Figure 1:
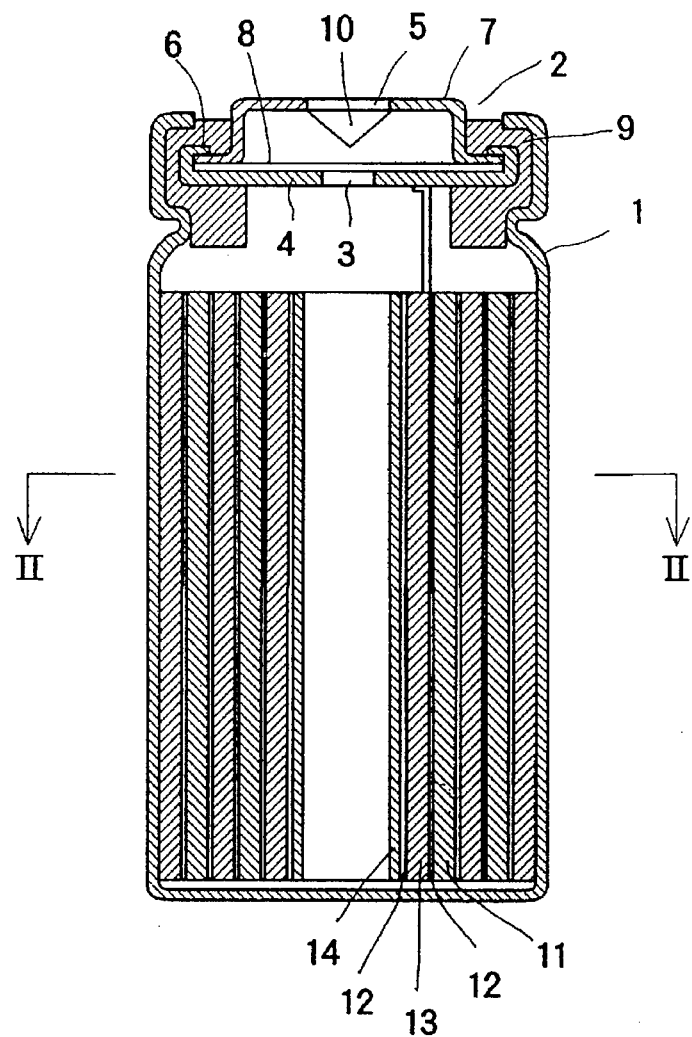
FIG. 1 is a diagrammatic vertical cross-sectional view of the secondary battery of the present invention which was prepared in Example 1.

The foregoing and other objects, features and advantages of the present invention will be apparent from the following detailed description taken in connection with the accompanying drawing and the appended claims.

According to the present invention, there is provided a secondary battery comprising:

a casing, an organic electrolytic solution contained in the casing, the solution having a water content of from 5 to 450 ppm, a positive electrode comprising a lithium-containing composite metal oxide as a cathode active material, a negative electrode comprising a carbonaceous material as an anode active material, and a separator disposed between the positive and negative electrodes, the positive and negative electrodes and separator being disposed in the organic electrolytic solution.

In the secondary battery of the present invention, the water content of the organic electrolytic solution contained in the battery is particularly important and must be in the range of from 5 ppm to 450 ppm, preferably from 15 ppm to 300 ppm.

When the water content exceeds 450 ppm, gases including hydrogen gas are likely to be produced within the battery to thereby disadvantageously cause a rise in internal pressure, leading to an occurrence of expansion of the battery. On the other hand, for controlling the water content of the organic electrolytic solution contained in the battery to less than 5 ppm, not only is it necessary to conduct dehydrating treatment for an extremely long period of time but also an extremely strict control of moisture in assembling a battery is needed, which disadvantageously imposes various difficult problems.

The water content in the range specified in the present invention can be controlled by treating the organic electrolytic solution with a dehydrating agent, such as a molecular sieve or the like. With respect to various parts, such as, the positive and negative electrodes, the separator, etc., the water content thereof can be controlled, for example, by using the parts which have preliminarily been subjected to a drying treatment, or by inserting a parts-drying step in the battery assembling procedure prior to the step for impregnating the parts with the organic electrolytic solution.

It is noted that for achieving the water content ranging from 5 ppm to 450 ppm with respect to the organic electrolytic solution contained in the secondary battery of the present invention, extremely strict drying conditions need not be used in the battery assembling procedure. Especially when the above-mentioned parts-drying step is inserted prior to the step for impregnating the parts with the organic electrolytic solution, control of the water content of the organic electrolytic solution within the range specified in the present invention can be achieved even by handling the parts under ordinary ambient conditions prior to the parts-drying step. This has a great advantage from a practical point of view.

The lithium-containing composite metal oxide used in the secondary battery of the present invention is a compound having a lamellar structure and having the capability to electrochemically intercalate and deintercalate Li ions. Although such composite metal oxides are not specifically limited, the following compounds can be mentioned as preferred examples of composite metal oxides: $LiCoO_2$ disclosed in Japanese Patent Application laid-Open Specification No. 55-136,131 (corresponding to U.S. Pat. No. 4,357,215); $Li_xCo_yN_zO_2$ wherein N is at least one member selected from the group consisting of Al, In and Sn, and x, y and z are, respectively, defined by $0.05 \leq x \leq 1.10$, $0.85 \leq y \leq 1.00$, and $0.001 \leq z \leq 0.10$, as disclosed in Japanese Patent Application Laid-Open Specification No. 62-90,863 (corresponding to U.S. Pat. No. 4,668,595); $Li_xNi_yCo_{(1-y)}O_2$ wherein $0 < x \leq 1$, and $0 \leq y < 0.50$, as disclosed in Japanese Patent Application Laid-Open Specification No. 3-49,155; and $Li_xMnO_2$.

These compounds can be easily obtained by the calcination reaction of a lithium compound, such as lithium hydroxide, lithium oxide, lithium carbonate, lithium nitrate or the like, with an oxide, hydroxide, carbonate, nitrate or the like of a predetermined metal and, if desired, with other metal compounds.

These composite metal oxides can, as anode active materials, exhibit excellent properties, such as high voltage and high capacity, as compared to those of conventional active materials. Especially, a compound represented by $Li_xCo_yN_zO_2$ wherein N is at least one member selected from the group consisting of Al, In and Sn, and x, y and z are, respectively, defined by $0.05 \leq x \leq 1.10$, $0.85 \leq y \leq 1.00$, and $0.001 \leq z \leq 0.10$, has excellent cycle characteristics etc., so that this compound can be advantageously used as a cathode active material.

The carbonaceous material used in the secondary battery of the present invention is not particularly limited, and various types of carbonaceous materials can be used, for example, a carbon or graphite material having a large surface area which is disclosed in Japanese Patent Application Laid-Open Specification No. 58-35,881 (corresponding to U.S. Pat. No. 4,617,243), a calcination carbonized product of a phenolic resin which is disclosed in Japanese Patent Application Laid-Open Specification No. 58-209,864, a calcination carbonized product of a condensed polycyclic hydrocarbon compound which is disclosed in Japanese Patent Application Laid-Open Specification No. 61-111,907 (corresponding to U.S. Pat. No. 4,725,422), and a carbonaceous material disclosed in Japanese Patent Application Laid-Open Specification No. 62-90,863, which has a BET specific surface area A ($m^2/g$) in the range of $0.1 < A < 100$, and has a crystal thickness Lc (Å) in the X-ray diffraction and a true density $\rho$ ($g/cm^3$), respectively satisfying $10 < Lc < 120\rho189$ and $1.70 < \rho < 2.18$. Among these, the last-mentioned carbonaceous material has high capacity and excellent cycle characteristics and can be advantageously used in the present invention.

A method for constructing positive and negative electrodes respectively from the above-mentioned cathode and anode active materials is not specifically limited. However, it is preferred that a respective active material be dispersed in a solution of an organic polymer as a binder dissolved in a solvent therefor and the resultant dispersion be applied to a substrate by coating, because fabrication of the active material into a thin film having a large area can be achieved. In the present invention, it is further preferred that at least one of the positive and negative electrodes be in the form of a coating composition formed on a metallic current collector, in which the coating composition comprises an active material corresponding to the respective electrode and a binder, wherein the binder is distributed in the coating at a binder distribution coefficient of from 0.5 to 5.0, preferably from 0.75 to 2.5, more preferably from 0.75 to 2.0. The use of a binder distribution coefficient in the above range is advantageously effective for preventing a lowering of the strength of the coating composition and preventing a failure in contact between the active material particles, thereby improving high temperature characteristics of the secondary battery of the present invention.

The term "binder distribution coefficient" used in the present invention is a coefficient obtained by the measuring method described below. This coefficient is defined as a ratio of the amount of a binder present in the coating composition layer from its surface to the depth of 10 μm to the amount of a binder present in the coating composition layer from the interface between the metallic current collector and the coating composition layer to the level of 10 μm above the collector.

Measurement For Determining The Binder Distribution Coefficient:

Sample:

An electrode to be measured is embedded in an epoxy resin, followed by solidification of the resin. Cutting is made to expose a cross section of the electrode and the cross-section is polished before it is used as a sample for measurement. Pretreatment of the sample with, for example, osmic acid is effective for making the measurement more precise. A method of pretreatment may be selected arbitrarily, depending on the type of the binder.

Measurement:

The amounts of binder respectively in the predetermined layers of coating composition of the cross section of the electrode are measured by electron probe micro analysis (EPMA).

As measuring apparatus, Hitachi X-650 (manufactured by Hitachi, Ltd., Japan) and Horiba EMAX-2200 (manufactured by Horiba Seisakusho Co., Ltd., Japan), which are wavelength dispersion type electron probe microanalyzers, are employed.

Calculation of The Binder Distribution Coefficient:

The binder distribution coefficient is calculated by the following formula:

Binder distribution coefficient =

$$\frac{\text{Measured intensity corresponding to the amount of a binder present in the coating composition layer from its surface to the depth of 10 } \mu m}{\substack{\text{Measured intensity corresponding to the amount of a binder present} \\ \text{in the coating composition layer from the interface between the} \\ \text{metallic current collector and the coating composition layer} \\ \text{to the level of 10 } \mu m \text{ above the collector}}}$$

When the binder distribution coefficient is less than 0.5, the surface strength of the coating composition disadvantageously becomes low, so that the active material is likely to fall off from the current collector. On the other hand, when the binder distribution coefficient exceeds 5.0, the characteristics of the battery, in particular cycle characteristics, storage characteristics, and battery performances such as output characteristics, disadvantageously become poor.

A binder distribution coefficient of from 0.5 to 5.0 can be attained by adjusting the conditions for the above-mentioned coating method. Examples of such conditions include selection of a binder, selection of a solvent for preparing a coating liquid, viscosity of the coating liquid, solids concentration of the coating liquid, drying method and drying temperature.

Although the rate of drying is not specifically limited, it is generally preferred that the rate of drying be low. Further, it is also preferred that the viscosity and solids concentration of the coating liquid be high.

The type of metallic current collector is not specifically limited, but a metallic foil is preferably used. In addition, it is preferred that the metallic foil have a surface roughness of from 0.1 to 0.9 μm, which is effective for increasing the adherence between the coating composition and the metallic foil and for improving the high temperature characteristics of the secondary battery of the present invention.

A metallic foil having the above-mentioned surface roughness assumes a lusterless appearance. Such a metallic foil can be obtained by subjecting a metallic foil having a glossy or semiglossy appearance to etching treatment, laser treatment, electroless plating, electrolytic plating, sandblasting or the like to control the surface roughness of the metallic foil so that it falls in the range of from 0.1 to 0.9 μm, preferably from 0.2 to 0.8 μm, more preferably from 0.6 to 0.8 μm. Those copper foil, nickel foil and the like which are directly obtained by electrolytic plating and have a surface roughness falling in the above-mentioned range can also be used as the metallic current collector in the present invention.

The metallic foil having a surface roughness less than 0.1 μm is not desirable since an improvement in adherence with the coating composition is hardly attained. The metallic foil having a surface roughness higher than 0.9 μm is also not desirable, since such a metallic foil is likely to suffer a tearing during the coating operation.

With respect to measurement of the surface roughness of a metallic foil, a sample therefor is prepared by cutting a piece of foil (1 cm×1 cm) from the metallic foil. Then, it is placed in a mold, into which an epoxy resin is then poured and hardened. The contents of the mold are allowed to stand at room temperature for one day, and then taken out from the mold and cut to expose a cross section of the sample foil. The surface of the cross section of the resin including the cross section of the metallic foil is polished with a rotating grinder while the cross section of the metallic foil embedded in the epoxy resin is also rotated, and then subjected to air blowing. Subsequently, a photomicrograph of the cross section is taken. The photomicrograph is enlarged and the depths of the concaves on the surface of the metallic foil are measured, and an average depth obtained therefrom is taken as a surface roughness.

The thickness of the coating composition, comprising a cathode active material and a binder, adhering to the metallic foil, is preferably from 30 to 300 μm, more preferably from 70 to 130 μm per one side. Examples of metallic foils to be used for a positive electrode in the present invention include an aluminum foil, a nickel foil and a stainless steel foil, each having a thickness of 5 to 100 μm. Among these foils, an aluminum foil of from 8 to 50 μm, preferably from 10 to 30 μm, in thickness is advantageously used.

The thickness of the coating composition, comprising an anode active material and a binder, adhering to the metallic foil, is preferably from 60 to 750 μm, more preferably from 140 to 400 μm per one side. Examples of metallic foils to be used for a negative electrode in the present invention include a copper foil, a nickel foil and a stainless steel foil, each having a thickness of from 5 to 100 μm. Among these foils, a copper or stainless steel foil of from 6 to 50 μm, preferably from 8 to 25 μm in thickness, is advantageously used.

An adherence test to evaluate the adherence between the active material particles and the metallic foil is conducted as follows. Active material particles and a binder are applied to a metallic foil, and then dried and compressed to obtain an electrode. The thus obtained electrode is subjected to sizing. A fragment of 2 cm in width and 5 cm in length is cut from the electrode with an NT cutter (manufactured and sold by NT Co., Ltd., Japan) to prepare a test sample.

The active material and binder adhering to the metallic foil are stripped off by 2 cm from the edge of the sample in a longitudinal direction so that a portion of the surface of the metallic foil is exposed. This portion is attached to a metallic plate by means of a stapler to thereby hang the sample.

Next, 80 ml of methanol is placed in a 100 ml glass beaker, which is then placed in an ultrasonic washer Model: Yamato 2200 manufactured by Yamato Co., Ltd., Japan. Tap water is poured into the ultrasonic washer between the glass beaker and the inner side wall of the washer to such an extent that the level of the tap water becomes slightly higher than the level of the methanol.

The test sample is placed in the methanol by suspending the above-mentioned metal plate with a string so that a portion of the metallic foil which has a length of 3 cm and to which the active material particles are adhered is completely impregnated with the methanol. The ultrasonic washer is turned on to thereby generate ultrasonic waves. Observations of the surface of the coating composition are continued to see whether a blistering occurs or not with the lapse of time.

With respect to the binder for binding an active material to a current collector, there is no particular limitation and, in general, various organic polymers can be employed as a binder. Examples of such binders include polyvinyl fluoride, polyvinylidene fluoride, a fluororubber, polyacrylonitrile, polymethacrylonitrile, a nitrile rubber, an ethylene-propylene rubber, a styrene-butadiene rubber, polymethyl methacrylate, a polysulfide rubber, cyanoethyl cellulose and methyl cellulose.

With respect to the method for using an organic polymer as a binder, various methods can be employed. Examples of methods include a method in which the organic polymer is dissolved in a solvent therefor to thereby prepare a binder solution, and an electrode active material is dispersed in the binder solution to thereby prepare a coating liquid, which is used for coating; a method in which an electrode active material is dispersed in an aqueous emulsion of the organic polymer to thereby prepare a coating liquid, which is used for coating; and a method in which an electrode active material is preliminarily molded, and a solution of the organic polymer and/or a dispersion of the organic polymer is applied to the surface of the preliminarily molded material.

Examples of solvents for an organic polymer as a binder include hydrocarbon solvents, such as toluene and hexane; amide solvents, such as dimethylformamide; ester solvents, such as ethyl acetate; ether solvents, such as butyl ether; and water. However, the solvent is not limited to these examples.

The amount of the binder is not particularly limited, but is generally from 0.1 to 20 parts by weight, preferably from 0.5 to 10 parts by weight per 100 parts by weight of the electrode active material.

From the viewpoint of improving high temperature characteristics, it is preferred that the binder comprise a styrene-butadiene latex having a butadiene content of from 40 to 95% by weight and a gel content of from 75 to 100%.

The above-mentioned styrene-butadiene latex can be commercially produced by the conventional techniques of emulsion polymerization. The styrene-butadiene latex has a butadiene content of from 40 to 95% by weight, and has a gel content of from 75 to 100%, preferably from 90 to 100%, as measured upon drying the styrene-butadiene latex. The terminology "gel content" used herein means the content of the toluene-insoluble matter in the polymer.

When the butadiene content of the styrene-butadiene latex is less than 40% by weight, the adhesion strength and flexibility of the electrode are likely to be unsatisfactory. On the other hand, when the butadiene content is more than 95% by weight, the adhesion strength of the electrode is likely to be unsatisfactory.

When the gel content of the styrene-butadiene latex is less than 75%, the battery is likely to be unsatisfactory in not only the adhesion strength of the electrode and the swelling resistance of the electrode to an electrolytic solution (described later) for use in a non-aqueous type battery, but also charge retention capability under high temperature conditions. The exact reason why the gel content of a styrene-butadiene latex polymer affects the charge retention capability at high temperatures has not yet been elucidated. However, it is presumed that the crosslinking degree of the latex polymer, which is represented by the gel content thereof, affects the flow characteristics of the polymer at high temperatures and that the less the flowability of the polymer, the smaller the lowering of discharge capacity during a high temperature storage.

The styrene-butadiene latex may also contain monomers copolymerizable with styrene and butadiene. Examples of such copolymerizable monomers include ethylenically unsaturated carboxylic acid esters, such as methyl (meth) acrylate, ethyl (meth)acrylate, butyl (meth)acrylate, (meth) acrylonitrile and hydroxyethyl (meth)acrylate; and ethylenically unsaturated carboxylic acids, such as acrylic acid, methacrylic acid, itaconic acid, fumaric acid and maleic acid. With respect to the ethylenically unsaturated carboxylic acids, use of a dicarboxylic acid, such as itaconic acid, fumaric acid and maleic acid, is preferred from the viewpoint of increasing the adhesive strength of the electrode. Adjustment of the gel content can be performed by conventional techniques, such as controlling the polymerization temperature, the amount of an initiator, and the amount of a chain transfer agent.

The particle diameter of the styrene-butadiene latex is not particularly limited, but is generally from 0.01 to 5 µm, preferably from 0.01 to 0.3 µm.

The amount of the styrene-butadiene latex in the coating composition containing an active material is not particularly limited. However, the amount of the latex is generally from 0.1 to 20 parts by weight, preferably from 0.5 to 10 parts by weight per 100 parts by weight of the active material. When the amount of the latex is less than 0.1 part by weight, a good adhesion strength cannot be obtained. On the other hand, when the amount of the latex is larger than 20 parts by weight, the overpotential is markedly increased, thereby adversely affecting the characteristics of the battery.

The solids concentration of the coating liquid is not particularly limited, but is generally from 30 to 65% by weight, preferably from 40 to 65% by weight.

Further, when a water-soluble polymer, such as a styrene-butadiene latex, is used as a binder, a water-soluble thickener may be added as an additive thereto in an amount of 2 to 60 parts by weight per 100 parts by weight of the solid value of the styrene-butadiene latex.

As examples of the water-soluble thickner, there can be mentioned carboxymethyl cellulose, methyl cellulose, hydroxymethyl cellulose, ethyl cellulose, polyvinyl alcohol, polyacrylic acid (or polyacrylate), oxidized starch, phosphorylated starch, casein and the like.

In addition, other additives can also be added to the coating liquid. Examples of such other additives include a dispersant, such as sodium hexametaphosphate, sodium tripolyphosphate, sodium pyrophosphate and sodium polyacrylate, and a nonionic or anionic surfactant as a stabilizer for the latex.

When a styrene-butadiene latex is used as a binder for an anode active material, the average particle diameter of a carbonaceous material as the anode active material is preferably in the range of from 0.1 to 50 µm, more preferably from 3 to 25 µm, and still more preferably from 5 to 15 µm. When the above-mentioned average particle diameter does not fall in the range of from 0.1 to 50 µm, various problems are likely to occur, such as a lowering of the current efficiency, a lowering of the stability of a slurry as the coating liquid comprising the carbonaceous material and the latex, and a rise in the inter-particle resistance in the coating composition layer of the electrode obtained.

A slurry containing an active material and a latex is applied to a substrate as a coating liquid, and then dried to form an electrode. Simultaneously with the formation of the electrode, a current collector may be attached to the electrode. Alternatively, a metallic current collector, such as aluminum foil and copper foil, may be used as the substrate.

In such coating methods, any of the known coater heads, such as those used in the reverse roll method, Comma bar method, gravure method and air knife method, can be used.

The material for the separator is not particularly limited. Examples of separator materials include woven fabrics, non-woven fabrics, woven fabrics of glass fibers, and microporous membranes of synthetic resin. When electrodes comprised of membranes having a large surface area are used, use of such a microporous membrane of synthetic resin, particularly of a polyolefin, as disclosed in, for example, Japanese Patent Application Laid-Open Specification No. 58-59072, is preferred from the viewpoint of desired thickness, strength and membrane resistance.

The electrolyte for the organic electrolytic solution is not particularly limited. Examples of electrolytes include $LiClO_4$, $LiBF_4$, $LiAsF_6$, $CF_3SO_3Li$, $(CF_3SO_2)_2N\cdot Li$, $LiPF_6$, $LiI$, $LiAlCl_4$, $NaClO_4$, $NaBF_4$, $NaI$, $(n-Bu)_4N^+ClO_4$, $(n-Bu)_4N^+BF_4$ and $KPF_6$. The electrolyte concentration of the organic electrolytic solution is generally from about 0.1 to about 2.5M.

Examples of organic solvents usable in the organic electrolytic solution include ethers, ketones, lactones, nitriles, amines, amides, sulfur compounds, chlorinated hydrocarbons, esters, carbonates, nitro compounds, phosphoric ester compounds and sulfolane compounds. Of the organic solvents mentioned above, ethers, ketones, nitriles, chlorinated hydrocarbons, carbonates and sulfolane compounds are preferred. More preferred are cyclic carbonates. Typical examples of cyclic carbonates include tetrahydrofuran, 2-methyltetrahydrofuran, 1,4-dioxane, anisole, monoglyme, acetonitrile, propionitrile, 4-methyl-2-pentanone, butyronitrile, valeronitrile, benzonitrile, 1,2-dichloroethane, gamma-butyrolactone, dimethoxyethane, methyl formate, propylene carbonate, ethylene carbonate, vinylene carbonate, dimethylformamide, dimethylsulfoxide, dimethylthioformamide, sulfolane, 3-methylsulfolane, trimethyl phosphate, triethyl phosphate, and mixtures thereof. Organic solvents are not limited to the above examples.

The structure of the secondary battery is not particularly limited. Examples of battery structures include a paper type battery structure having a positive electrode, a separator and a negative electrode in a single composite layer or a plurality of composite layers, a stack type battery structure, and a cylindrical battery structure having a positive electrode, a separator and a negative electrode wound up in the form of a roll. It is preferred that the positive and negative electrodes be spirally wound into a structure in which the positive and negative electrodes are arranged opposite to each other with a separator therebetween, and in which each of an innermost wound electrode layer and an outermost wound electrode layer of the spirally wound structure comprises a layer of the negative electrode. Such a structure is preferred because deposition of metallic lithium can be markedly suppressed, thereby effectively preventing a lowering of the battery capacity which is caused by repeated use, and deterioration of the battery due to self-discharging and overcharging.

In such a spirally wound structure, it is preferred that a cathode active material at each of portions where the winding of the electrodes starts and terminates, be completely covered by the negative electrode through the separator so as not to expose the cathode active material. The negative electrode to be used in this case may be a laminate in which two sheets of metallic foils as current collectors, each having an anode active material adhered onto one side thereof, are disposed so that respective sides of the sheets having no active material thereon are brought into contact with each other. Alternatively, the negative electrode may be comprised of a sheet of metallic foil having an anode active material adhered onto both sides thereof. The positive electrode to be used may be of the same structure as that of the negative electrode.

When completely covering the cathode active material with the negative electrode through the separator, it is preferred that the excessive length of the negative electrode relative to the length of the positive electrode be as short as possible from the viewpoint of decreasing the quantities to be packed. However, when the excessive length of the negative electrode is designed to be too short, it is likely that a spirally wound structure is produced in which the cathode active material is partially exposed. This is due to various factors, for examples, defects such that the thickness of each electrode is uneven and that a winding machine is unsatisfactory with respect to the precision in measuring the lengths of the electrodes. Thus, it is preferred that the positive electrode at each of portions where the winding starts and terminates, be completely covered by the negative electrode through the separator, and that at each of the above-mentioned portions, the distance between the staggered ends of the positive and negative electrodes which are arranged opposite to each other with the separator therebetween in the intermediate portion of a spirally wound structure, be from 1 to 10 mm, more preferably from 2 to 5 mm.

In the secondary battery of the present invention, it is preferred that the battery further include as a safety device a PTC (positive temperature coefficient) element which is operative at a temperature of from 80° C. to 140° C. and has a sensitive temperature coefficient of from −10 to −130.

Conventionally, various PTC elements are known. Examples of conventional PTC elements include $BaTiO_3$ ceramic type PTC elements. The PTC element to be used in the present invention is an element which is protective against overcurrent and overheating and in which an electrically conductive polymer having PTC characteristics (i.e., characteristics such that the electrical resistance is increased with an increase in temperature) is utilized. Examples of PTC elements usable in the present invention include various commercially available protective elements which are manufactured and sold by K.K. Raychem Japan, Japan under the trademark of Polyswitch®. The PTC element has a sensitivity to both temperature and current and has a function that when either of temperature and current exceeds a predetermined upper limit, the resistance of the element is automatically raised, thereby shutting off the current. It is well known in the art that such a PTC element can be included in a battery as a safety device. For example, it has already been a customary practice that a primary lithium battery including such a PTC element is used, so that when the battery suffers short-circuiting through an external circuit, the current is shut off by the action of the PTC element, thereby assuring the safety of the battery.

However, Applicants have studied the factors accompanying the occurrence of overcharging of a secondary battery in detail. As a result, the following facts have been found:

(1) Heat generation is always involved before the overcharged battery is bursted;

(2) Temperature elevation of the battery due to the heat generation is proportionally dependent on the overcharge current; and (3) The temperature of the battery casing at the time of bursting has a correlation with the overcharge current, and the larger the overcharge current, the lower the temperature of the battery casing as measured at the time of bursting (it is presumed that a large temperature distribution is produced due to a high rate of temperature elevation, so that a lower temperature value is detected at the casing than the temperature inside the battery casing).

As apparent from the above findings, safety of the secondary battery of the present invention at the time of occurrence of overcharge cannot be effectively ensured by simply using a fuse which is sensitive only to temperature. On the other hand, when the battery has a fuse which is sensitive only to current, current cannot be precisely detected with high sensitivity and, therefore, it is impossible to distinguish a normal current from an overcharge current, so that such a fuse also is not effective to ensure safety of the secondary battery at the time of occurrence of overcharge.

As indicated above, the secondary battery of the present invention is greatly different in behavior at the time of occurrence of overcharge from conventional batteries. This difference in behavior is ascribed to the unique combination of active materials for the positive and negative electrodes used in the secondary battery of the present invention. Thus, for ensuring the safety of the secondary battery of the present invention at the time of occurrence of overcharge, it is preferred that the secondary battery be provided with a safety device which is sensitive to both temperature and current and has a sensitive temperature coefficient of a negative value in a specific range. The terminology "sensitive temperature coefficient" used herein means a parameter which is determined by the method described below and exhibits a current-dependent sensitive temperature.

Determination of Sensitive Temperature Coefficient

A PTC element is connected to a direct-current power source capable of constantly producing a predetermined current and then, heated in an oven to elevate a temperature thereof while applying a predetermined current (A) to the element. When a resistance value of the PTC element becomes 1000-fold over the value measured at room temperature, the temperature (°C.) of the PTC element is measured. The above operation is repeated except the current is varied, and the respective temperature of the PTC element is measured in the same manner as mentioned above, to thereby obtain five temperature values in total. The temperatures (ordinate) are plotted against the currents (abscissa). The sensitive temperature coefficient can be obtained as a gradient of the straight line drawn by connecting the plotted five points.

The temperature at which the PTC element is operative (operative temperature), means a temperature at which, when a PTC element is heated without flowing current, the resistance value of the PTC element becomes 1000-fold over the value measured at room temperature.

The operative temperature of the PTC element to be used in the present invention is preferably from 80° to 140° C., more preferably from 85° to 140° C. When the operative temperature of the PTC element exceeds 140° C., even if the PTC element operates at that temperature, the secondary battery continues to produce heat, thereby causing a bursting of the secondary battery. On the other hand, when the operative temperature of the PTC element is less than 80° C., the PTC element is likely to wrongly operate at a practically employable temperature.

The sensitive temperature coefficient of the PTC element is preferably from −10 to −130, more preferably from −15 to −100, most preferably from −25 to −80.

When the absolute value of the sensitive temperature coefficient of the PTC element is less than 10, safety at the time of occurrence of overcharge in the high current range becomes incomplete and, therefore, a bursting of the secondary battery is likely to occur. On the other hand, when the absolute value of the sensitive temperature coefficient of the PTC element exceeds 130, a practically employable current value, namely, an employable current value at room temperature becomes low and, therefore, the secondary battery having the above-mentioned PTC element attached thereto cannot be practically used.

In the present invention, the method for attaching the PTC element to the secondary battery is not particularly limited. For example, the PTC element can be attached to the secondary battery of the present invention within a casing thereof, at a cover for the casing, at a wall of the casing, or the like. As a matter of course, it is desirable that the PTC element be at tached to a portion at which the element is more exactly sensitive to a temperature of the secondary battery. Further, it is noted that when the secondary battery of the present invention is equipped with a PTC element having the above-mentioned specific properties, safety against overcharging can be advantageously secured in the entire current range.

In the secondary battery of the present invention, as mentioned above, the water content of the organic electrolytic solution contained in the casing of the secondary battery is especially important. The terminology "water content" means a water content of the organic electrolytic solution contained in the casing of the secondary battery which has been assembled and has not yet been charged. Generally, the organic electrolytic solution contained in the casing is likely to be contaminated with water from the following origins:

(a) water which has been originally contained in the organic electrolytic solution;

(b) water which has been originally contained in parts to be assembled into the secondary battery, such as positive and negative electrodes, a separator and the like; and (c) water in air which is likely to be incorporated into the organic electrolytic solution during the course of assembling the secondary battery.

With respect to use of the secondary battery of the present invention, there is no particular limitation. The secondary battery of the present invention exhibits a high voltage and a high energy density and, therefore, can be advantageously used for, e.g., practicing a method for driving a portable electronic equipment, which comprises electrically connecting the single secondary battery to a portable electronic equipment containing an IC element operative at a voltage of from 2.6 to 3.5 V. By the use of the secondary battery of the present invention in the above-mentioned method, a portable electronic equipment which is small in size and light in weight, can be provided.

Such portable electronic equipment can be driven at a voltage of from 2.5 to 4.2 V, wherein a power consumption is 4 W or less, preferably from 0.5 to 3 W. Examples of such portable electronic equipment include a personal computer which can be driven at a voltage of 3.3 V, an integrated video camera which can be driven at a voltage of 3.5 V, a portable communication apparatus which can be driven at a voltage of 3.3 V.

For use in the above-mentioned electronic equipment, it is preferred that the capacity of the secondary battery be 400 mAh or more, preferably 700 mAh or more, more preferably from 1500 mAh to 4000 mAh.

When the capacity of the secondary battery is less than 400 mAh, the secondary battery cannot be continuously used for a long period of time. On the other hand, when the capacity of the secondary battery exceeds 4000 mAh, a small and light-in-weight portable electronic equipment can be hardly realized.

PREFERRED EMBODIMENTS OF THE INVENTION

Hereinbelow, the present invention will be illustrated with reference to Examples, which, however, should not be construed as limiting the present invention.

EXAMPLE 1

100 parts by weight of a Li-Co type composite oxide of a composition of $Li_{1.03}Co_{0.92}Sn_{0.02}O_2$ were mixed with 2.5 parts by weight of graphite and 2.5 parts by weight of acetylene black. The resultant mixture was further mixed with a solution which had been prepared by dissolving 2 parts by weight of a fluororubber (which is a terpolymer of tetrafluoroethylene, vinylidene fluoride and hexafluoropropylene) in 60 parts by weight of a mixed solvent of ethyl acetate and ethyl cellosolve in a weight ratio of 1:1. Thus, a slurry for coating was obtained.

Using a coater equipped with a doctor blade coater head, the obtained slurry was applied in a thickness of 290 µm to both surfaces of an aluminum foil having a width of 600 mm and a thickness of 15 µm.

On the other hand, 100 parts by weight of pulverized needle coke were mixed with a solution which had been prepared by dissolving 5 parts by weight of a fluororubber (which is of the same type as mentioned above) in 90 parts by weight of a mixed solvent of ethyl acetate and ethyl cellosolve in a weight ratio of 1:1. Thus, another slurry for coating was obtained.

Using a coater equipped with a doctor blade coater head, the obtained slurry was applied in a thickness of 350 μm to both surfaces of a copper foil having a width of 600 mm and a thickness of 10 μm.

The above-obtained coated aluminum foil and copper foil were individually pressed by means of a calender roll and then, fabricated by means of a slitter to form a slit having a width of 41 mm. The aluminum foil having a coating containing $Li_{1.03}Co_{0.92}Sn_{0.02}O_2$ (as a cathode active material), the copper foil having a coating containing pulverized needle coke (as an anode active material) and a microporous polyethylene membrane (HIPORE 4030U, manufactured and sold by Asahi Kasei Kogyo Kabushiki Kaisha, Japan) (as a separator) were spirally wound by means of a winding machine into a spirally wound structure having an outer diameter of 14.9 mm, wherein the separator is disposed between the aluminum and copper foils. The spirally wound structure was placed in a casing having an outer diameter of 16 mm and then, the spirally wound structure in the casing was impregnated with an organic electrolytic solution which had been prepared by dissolving 1M $LiBF_4$ in a mixed solvent of propylene carbonate, ethylene carbonate and gamma-butyrolactone in a weight ratio of 1:1:2. The casing was then sealed to thereby obtain a secondary battery having a height of 50 mm, as shown in FIG. 1.

Figure 2:
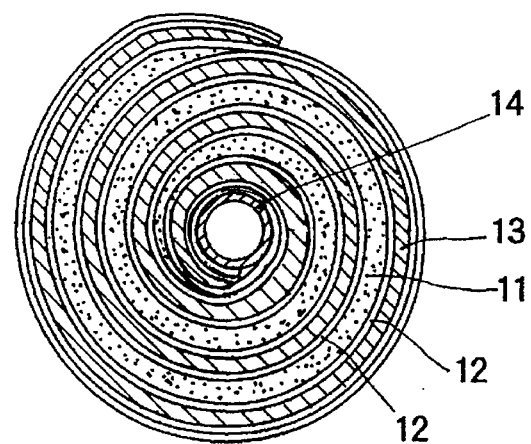
FIG. 2 is a diagrammatic cross-sectional view, taken along line II—II of FIG. 1, showing the spirally wound states of a positive electrode, a separator and a negative electrode.

In the accompanying drawing, FIG. 1 is a diagrammatic, vertical cross-sectional view of the secondary battery of the present invention produced in Example 1. FIG. 2 is a diagrammatic, cross-sectional view taken along line II—II of FIG. 1, showing the spirally wound states of a positive electrode, a separator and a negative electrode, with casing 1 omitted.

In FIG. 1, numeral 1 represents a casing, numeral 2 a sealing cover, numeral 3 a valve hole, numeral 4 a covering plate, numeral 5 a gas vent, numeral 6 a bent brim, numeral 7 a terminal plate, numeral 8 a flexible thin plate, numeral 9 an insulating packing, numeral 10 a cutting blade, numeral 11 a positive electrode plate, numeral 12 a separator, numeral 13 a negative electrode plate, and numeral 14 a pipe.

Referring to FIG. 1, a safety valve device is provided at the top portion of casing 1, namely at sealing cover 2. The safety value device is comprised of covering plate 4 bored to have valve hole 3, and dish-shaped terminal plate 7 having gas vent 5 and having its peripheral edge caulking-fitted below bent brim 6 of covering plate 4. The safety value device further comprises a flexible thin plate 8 made of a composite material of a metallic layer and a synthetic resin layer. Flexible thin plate 8 is securely held at its peripheral edge between covering plate 4 and terminal plate 7 and is normally in a state to close valve hole 3. Cutting blade 10 which is disposed opposite to flexible thin plate 8, is formed by inwardly bending a portion of terminal plate 7.

With such a structure of the safety valve device, when the pressure inside the battery rises to a predetermined level due, e.g., to an occurrence of overcharge, the safety valve device is caused to operate, so that flexible thin plate 8 is broken by the action of cutting blade 10 and the gas inside the battery is discharged into the air through valve hole 3 and then vent 5. Thus, the battery can be prevented from being explosively destroyed.

FIG. 2 is a diagrammatic cross-sectional view taken along line II—II of FIG. 1, showing the spirally wound states of the positive electrode, the separator and the negative electrode. That is, the positive and negative electrodes are spirally wound into a structure such that the positive and negative electrodes are arranged opposite to each other with the separator therebetween, wherein each of an innermost wound electrode layer and an outermost wound electrode layer of the spirally wound structure comprises a layer of the negative electrode. In such a structure, the surface of the cathode active material of the positive electrode is completely covered with the negative electrode through the separator, thereby preventing the cathode active material from being exposed. In FIG. 2, for easy understanding of the spirally wound state, the negative electrode is indicated by hatching and the positive electrode is indicated by dotting.

The procedure for spirally winding the positive electrode, the separator and the negative electrode by means of the winding machine is further described in detail as follows.

Two reels of separator 12, one reel of positive electrode 11 and one reel of negative electrode 13, namely four reels in total, were set in a reel-type automatic winding machine, and winding was conducted under the following winding conditions:

shaft diameter: 4 mmφ, outer winding length of separator: 66 mm, second roller length of negative electrode: 370 mm, second roller length of positive electrode: 340 mm, and inner winding length of negative electrode: 9 mm.

Conditions, such as an atmosphere for battery assembling and the water content of an electrolytic solution, are shown in Table 1.

After assembling, the battery was opened, and the water content of the electrolytic solution in the battery was measured, and the electrolytic solution was found to have a water content of 75 ppm. The measurement of the water content was conducted using a gas chromatographic apparatus (GC-14A, Shimadzu Corporation, Japan). Porapack Q (1 m×3 φ) (manufactured by Gas Chro Ind., Japan) was employed as a column.

Another secondary battery was sampled from the same lot of products as that of the above-mentioned battery and charged. As a result, a normal battery performance was exhibited without occurrence of disadvantageous phenomena, such as expansion of a battery case, as indicated in Table 1.

EXAMPLES 2 TO 6 AND COMPARATIVE EXAMPLES 1 AND 2

Substantially the same procedure as in Example 1 was repeated, except that the operating conditions were varied as indicated in Table 1, to thereby produce secondary batteries of size A.

The thus produced secondary battery in each of the Examples and Comparative Examples was opened, and the water content of the electrolytic solution in the casing was measured. Further, an initial charge test was conducted with respect to another battery sampled from the same lot as that of the above-mentioned battery.

Results are also shown in Table 1.

TABLE 1

|   | Atmosphere of battery assembling | Water content of electrolytic solution used for impregnation | Drying step before impregnation | Water content of electrolytic solution after battery assembling | Current efficiency at 5th cycle | Occurrence of expansion of battery casing |
|---|---|---|---|---|---|---|
| Ex. 1 | Air with 10% RH | 45 ppm | present | 75 ppm | 99.6% | None |
| Ex. 2 | Air with 50% RH | 15 ppm | present | 18 ppm | 99.8% | None |
| Ex. 3 | Air with 80% RH | 80 ppm | present | 135 ppm | 99.3% | None |
| Ex. 4 | Air with 1% RH | 10 ppm | absent | 188 ppm | 99.5% | None |
| Ex. 5 | Air with 1% RH | 250 ppm | present | 298 ppm | 98.9% | None |
| Ex. 6 | Air with 50% RH | 250 ppm | present | 320 ppm | 98.1% | None |
| Comp. Ex. 1 | Air with 50% RH | 250 ppm | absent | 650 ppm | 97.9% | observed |
| Comp. Ex. 2 | Air with 50% RH | 15 ppm | absent | 480 ppm | 98.0% | observed |

(Note) RH: Relative humidity

EXAMPLES 7 TO 12

Substantially the same procedure as in Example 1 was repeated, except that when the positive and negative electrode sheets were prepared by coating, the operating conditions of a coater were varied as indicated in Table 2, to thereby produce secondary batteries. The binder dispersion coefficients of the above-obtained positive and negative electrode sheets are shown in Table 2.

A high-temperature cycle test was conducted at 60° C. with respect to the thus produced secondary batteries. Results are shown in Table 2.

TABLE 2

|   | Drying conditions | | Binder distribution coefficient | | Cycle test at 60° C. Capacity at 100th cycle (%) |
|---|---|---|---|---|---|
|   | Positive electrode | Negative electrode | Positive electrode | Negative electrode |   |
| Ex. 7 | Hot blast at 120° C. | Hot blast at 120° C. | 1.88 | 1.93 | 92 |
| Ex. 8 | Hot blast at 60° C. | Far infrared drying | 0.96 | 1.18 | 95 |
| Ex. 9 | Far infrared drying | Hot blast at 120° C. | 0.88 | 1.95 | 93 |
| Ex. 10 | Hot blast at 150° C. | Far infrared drying | 6.8 | 10.5 | 58 |
| Ex. 11 | Far infrared drying | Hot blast at 150° C. | 0.92 | 5.1 | 49 |
| Ex. 12 | Air drying at 25° C. | Air drying at 25° C. | 0.41 | 0.38 | 83 |

EXAMPLES 13 TO 16

Secondary batteries were prepared in substantially the same manner as in Example 7, except that copper foils having different surface roughnesses as indicated in Table 3 were individually used as a negative electrode current collector. The binder distribution coefficients of the obtained negative electrode sheets are shown in Table 3.

Results of an adherence test in which the negative electrode sheets were immersed in methanol, and results of a storage test in which the prepared batteries were stored for one month at 60° C. to determine the capacity retention, are also shown in Table 3.

TABLE 3

|   | Surface roughness of copper foil | Binder distribution coefficient of negative electrode | Adherence test by immersing in methanol | Capacity retention after storage for one month at 60° C. |
|---|---|---|---|---|
| Example 13 | 0.6μ | 1.91 | No blistering within 5 minutes | 89% |
| Example 14 | 0.3μ | 1.95 | No blistering within 5 minutes | 87% |
| Example 15 | 0.01μ | 1.90 | No blistering within 1 minute. Blistering in 2 minutes. | 61% |
| Example 16 | 0.04μ | 1.91 | No blistering within 1 minute. Blistering in 2 minutes | 63% |

EXAMPLES 17 TO 23

Secondary batteries were prepared in substantially the same manner as in Example 13, except that slurries having compositions described below were individually used as a coating slurry for forming a negative electrode.

100 Parts by weight of pulverized needle coke were mixed with 10 parts by weight of a styrene-butadiene latex (having a solids content of 50% by weight) prepared according to the respective formulation shown in Table 4, 100 parts by weight of an aqueous solution of carboxymethyl cellulose (having a solids content of 1% by weight) as a thickener and 1 part by weight of a 1/10N aqueous ammonia, thereby obtaining a respective coating slurry.

Results of an adherence test in which the negative electrode sheets were immersed in methanol, and results of a storage test in which the prepared batteries were stored for one month at 60° C. to determine the capacity retention, are also shown in Table 4.

TABLE 4

|  | Monomer formulation for latex | | | | Gel content | Binder distribution | Adherence test by immersing | Capacity retention after 1 month |
| --- | --- | --- | --- | --- | --- | --- | --- | --- |
|  | ST | BD | MMA | IA | (%) | coefficient | in methanol | at 60° C. |
| Example 17 | 47 | 40 | 10 | 3 | 83 | 1.75 | No blistering within 5 minutes | 93% |
| Example 18 | 42 | 55 | 0 | 3 | 80 | 1.81 | No blistering within 5 minutes | 92% |
| Example 19 | 33 | 60 | 5 | 2 | 98 | 1.95 | No blistering within 5 minutes | 95% |
| Example 20 | 18 | 80 | 0 | 2 | 90 | 1.70 | No blistering within 5 minutes | 94% |
| Example 21 | 4 | 95 | 0 | 1 | 78 | 1.51 | No blistering within 5 minutes | 92% |
| Example 22 | 47 | 30 | 20 | 3 | 55 | 1.78 | No blistering within 5 minutes | 88% |
| Example 23 | 0 | 100 | 0 | 0 | 80 | 1.79 | Blistering in 2 minutes | 73% |

ST: styrene;
BD: butadiene;
MMA: methyl methacrylate; and
IA: itaconic acid.
Each amount is shown by wt. %.

EXAMPLES 24 TO 29

Secondary batteries were prepared in substantially the same manner as in Example 17, except that a variety of PTC elements shown in Table 5 were individually used. The prepared batteries were subjected to overcharge test without voltage limitation. Results obtained are shown in Table 5.

Winding conditions:
Shaft diameter: 4 mm $\phi$
Outer winding length of a separator: 66 mm
Second roller length of a negative electrode: 340 mm
Second roller length of a positive electrode: 370 mm
Inner winding length of a positive electrode: 9 mm (When winding was conducted under the above conditions, each of the innermost wound electrode layer and the outermost wound electrode layer of the spirally wound structure became a positive electrode layer.)

TABLE 5

|  | Element | Operative temperature | Sensitive temperature coefficient | 2A over-charge | 3A over-charge | 4A over-charge | 5A over-charge | 6A over-charge |
| --- | --- | --- | --- | --- | --- | --- | --- | --- |
| Example 24 | PTC element | 120° C. | −38.0 | ○ | ○ | ○ | ○ | ○ |
| Example 25 | PTC element | 135° C. | −51.3 | ○ | ○ | ○ | ○ | ○ |
| Example 26 | PTC element | 118° C. | −20.1 | ○ | ○ | ○ | ○ | ○ |
| Example 27 | PTC element | 130° C. | −35.3 | ○ | ○ | ○ | ○ | ○ |
| Example 28 | PTC element | 138° C. | −75.3 | ○ | ○ | ○ | ○ | ○ |
| Example 29 | PTC element | 130° C. | −8.0 | ○ | × | × | × | × |

EXAMPLE 30

A secondary battery was prepared in substantially the same manner as in Example 1, except that winding conditions were changed as described below. The thus prepared battery and the battery prepared in Example 1 were both repeatedly charged and discharged up to 200 cycles, and then were allowed to stand for one month at 25° C., permitting the batteries to self-discharge.

Self-discharge ratio:
Example 1: 3%
Example 30: 15%

INDUSTRIAL APPLICABILITY

The secondary battery of the present invention, comprising an organic electrolytic solution and, disposed therein, a positive electrode comprised of a lithium-containing composite metal oxide as a cathode active material and a negative electrode comprised of a carbonaceous material as an anode active material, wherein the organic electrolytic solution has a water content of from 5 ppm to 450 ppm, has excellent current efficiency, cycle characteristics, storage characteristics and safety, and can be advantageously used as a power source for various electric devices and electronic devices.

The present invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A secondary battery comprising:

a casing, an organic electrolytic solution contained in said casing, said solution having a water content of from 5 to 450 ppm, a positive electrode comprising a lithium-containing composite metal oxide as a cathode active material, a negative electrode comprising a carbonaceous material as an anode active material, a separator disposed between said positive and negative electrodes, and a PTC element which has an operative temperature of from 80° C. to 140° C. and has a sensitive temperature coefficient of from −10 to −130, said operative temperature being defined as a temperature at which a resistance value of the PTC element becomes 1000-fold the resistance value measured at room temperature when the PTC element is heated without flowing current, said sensitive temperature coefficient being defined as a gradient of a straight line obtained by plotting temperatures, at which, when currents of various values are individually flowed through the PTC element, resistance values of the PTC element individually become 1000-fold the corresponding resistance values measured at room temperature, against the currents in coordinates of current (abscissa) and temperature (ordinate), said positive and negative electrodes and separator being disposed in said organic electrolytic solution, wherein at least one of said positive and negative electrodes is in the form of a coating composition formed on a metallic current collector, said coating composition comprising an active material corresponding to said respective electrode and a binder, said metallic current collector being formed of a metallic foil having a surface roughness of from 0.1 to 0.9 μm.

2. The secondary battery according to claim 1, wherein binder is distributed in said coating composition at a binder distribution coefficient of from 0.5 to 5.0.

3. The secondary battery according to claim 1 or 2, wherein said binder comprises a styrene-butadiene latex having a butadiene content of from 40 to 95% by weight and a gel content of from 75 to 100%.

4. The secondary battery according to claim 1, wherein said organic electrolytic solution comprises at least one organic solvent and an electrolyte dissolved therein, said at least one organic solvent being selected from the group consisting of an ether, a ketone, a lactone, a nitrile, an amine, an amide, a sulfur compound, a chlorinated hydrocarbon, an ester, a carbonate, a nitro compound, a phosphoric acid ester and a sulfolane compound.

5. The secondary battery according to claim 1, wherein said positive and negative electrodes are spirally wound into a structure such that said positive and negative electrodes are arranged opposite to each other with said separator therebetween, wherein each of an innermost wound electrode layer and an outermost wound electrode layer of said spirally wound structure comprises a layer of said negative electrode.

6. A method for preventing gas generation and rapid temperature elevation at overcharge of a secondary battery, thereby ensuring safety of the secondary battery, which comprises:

providing a PTC element such that said PTC element has an operative temperature of from 80° C. to 140° C. and a sensitive temperature coefficient of from −10 to −130, said operative temperature being defined as a temperature at which a resistance value of the PTC element becomes 1000-fold the resistance value measured at room temperature when the PTC element is heated without flowing current, said sensitive temperature coefficient being defined as a gradient of a straight line obtained by plotting temperatures, at which, when currents of various values are individually flowed through the PTC element, resistance values of the PTC element individually become 1000-fold the corresponding resistance values measured at room temperature, against the currents in coordinates of current (abscissa) and temperature (ordinate), and operably connecting said PTC element to a secondary battery, said secondary battery comprising:

a casing, an organic electrolytic solution contained in said casing, said solution having a water content of from 5 to 450 ppm, a positive electrode comprising a lithium-containing composite metal oxide as a cathode active material, a negative electrode comprising a carbonaceous material as an anode active material, and a separator disposed between said positive and negative electrodes, said positive and negative electrodes and separator being disposed in said organic electrolytic solution, wherein at least one of said positive and negative electrodes is in the form of a coating composition formed on a metallic current collector, said coating composition comprising an active material corresponding to said respective electrode and a binder, said metallic current collector being formed of a metallic foil having a surface roughness of from 0.1 to 0.9 μm.

7. The secondary battery according to claim 1, wherein said PTC element has a sensitive temperature coefficient of from −15 to −100.

8. The secondary battery according to claim 7, wherein said PTC element has a sensitive temperature coefficient of from −25 to −80.

9. The secondary battery according to claim 7, wherein said PTC element has an operative temperature of from 85° to 140° C.

10. The secondary battery according to claim 1, wherein said lithium-containing composite metal oxide is a compound represented by the formula $Li_xCo_yN_zO_2$ wherein N is at least one member selected from the group consisting of Al, In and Sn, x is a number from 0.05 to 1.10, y is a number from 0.85 to 1.00, and z is a number from 0.001 to 0.10.

11. The secondary battery according to claim 1, wherein said carbonaceous material has a BET specific surface area A (m$^2$/g) in the range of 0.1<A<100 and has a crystal thickness Lc (Å) and a true density $\rho$ (g/cm$^3$) that satisfy the relationships:

10<Lc<120$\rho$−189 and 1.70<$\rho$<2.18.

12. The secondary battery according to claim 10, wherein said carbonaceous material has a BET specific surface area A (m$^2$/g) in the range of 0.1<A<100 and has a crystal thickness Lc (Å) and a true density $\rho$ (g/cm$^3$) that satisfy the relationships:

10<Lc<120$\rho$−189 and 1.70<$\rho$<2.18.

13. The secondary battery according to claim 1, wherein said metallic foil has a surface roughness of from 0.6 to 0.8 μm.

14. The secondary battery according to claim 1, wherein said metallic foil is contained in said positive electrode and is made of aluminum, nickel or stainless steel.

15. The secondary battery according to claim 1, wherein said metallic foil is contained in said negative electrode and is made of copper, nickel or stainless steel.

16. The secondary battery according to claim 2, wherein said binder is distributed in said coating composition at a binder distribution coefficient of from 0.75 to 2.0.

17. The secondary battery according to claim 1, wherein said organic electrolytic solution contains an electrolyte selected from the group consisting of LiClO$_4$, LiBF$_4$, LiAsF$_6$, CF$_3$SO$_3$Li, (CF$_3$SO$_2$)$_2$N·Li, LiPF$_6$, LiI and LiAlCl$_4$.

* * * * *